United States Patent
Ben Hadj Fredj et al.

(10) Patent No.: US 12,224,832 B2
(45) Date of Patent: Feb. 11, 2025

(54) APPARATUS AND METHOD OF TRANSMITTING A CSI REPORT ON A TRANSMISSION OCCASION

(71) Applicant: Lenovo (Singapore) PTE. LTD, New Tech Park (SG)

(72) Inventors: Abir Ben Hadj Fredj, Wiesbaden (DE); Ankit Bhamri, Bad Nauheim (DE); Karthikeyan Ganesan, Nauheim (DE); Ravi Kuchibhotla, Chicago, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 3 days.

(21) Appl. No.: 18/023,734

(22) PCT Filed: Sep. 3, 2021

(86) PCT No.: PCT/US2021/049156
§ 371 (c)(1),
(2) Date: Feb. 28, 2023

(87) PCT Pub. No.: WO2022/051675
PCT Pub. Date: Mar. 10, 2022

(65) Prior Publication Data
US 2024/0014870 A1    Jan. 11, 2024

Related U.S. Application Data

(60) Provisional application No. 63/074,990, filed on Sep. 4, 2020.

(51) Int. Cl.
*H04B 7/06*    (2006.01)
*H04W 52/02*    (2009.01)
*H04W 76/28*    (2018.01)

(52) U.S. Cl.
CPC .......... *H04B 7/0626* (2013.01); *H04B 7/063* (2013.01); *H04B 7/0639* (2013.01); *H04W 52/0229* (2013.01); *H04W 76/28* (2018.02)

(58) Field of Classification Search
CPC .......... H04B 1/38; H04B 1/40; H04B 7/0408; H04B 7/0626; H04B 7/063; H04B 7/0632;
(Continued)

(56) References Cited

U.S. PATENT DOCUMENTS

2020/0229093 A1* 7/2020 Ahmad ............. H04W 52/0209
2021/0345148 A1* 11/2021 Lin ........................ H04L 5/0094
(Continued)

FOREIGN PATENT DOCUMENTS

CN    109561038 A  *  4/2019  ......... H04L 27/2602

*Primary Examiner* — Young T. Tse
(74) *Attorney, Agent, or Firm* — FIG. 1 Patents

(57) ABSTRACT

A WUS monitoring configuration can be received (1210) from a network. A DRX mode configuration comprising at least an active period can be received (1220). At least one CSI reporting configuration can be received (1230). The at least one CSI reporting configuration can configure transmission occasions for transmission of at least one CSI report to the network outside the active period. A time offset configuration for CSI transmission outside the active period can be received (1240). A CSI report can be transmitted (1250) on a transmission occasion of the configured transmission occasions. The transmission occasion can be within the configured time offset from a WUS monitoring occasion. The WUS monitoring occasion can be outside the active period.

20 Claims, 10 Drawing Sheets

(58) Field of Classification Search
CPC . H04B 7/0639; H04W 52/0229; H04W 76/28
USPC ........ 375/219, 259, 260; 370/328, 329, 336, 370/341, 345
See application file for complete search history.

(56) References Cited

U.S. PATENT DOCUMENTS

| | | | |
|---|---|---|---|
| 2021/0377852 A1* | 12/2021 | Zhou | H04W 24/10 |
| 2021/0410098 A1* | 12/2021 | Bao | G01S 5/01 |
| 2022/0159570 A1* | 5/2022 | Liu | H04W 72/0446 |
| 2022/0360306 A1* | 11/2022 | Sun | H04L 5/0053 |

* cited by examiner

APPARATUS AND METHOD OF TRANSMITTING A CSI REPORT ON A TRANSMISSION OCCASION

BACKGROUND

1. Field

The present disclosure is directed to an apparatus and method for communications on a wireless network. More particularly, the present disclosure is directed to transmitting a CSI report on a transmission occasion.

2. Introduction

Presently, wireless communication devices, such as UEs, communicate with other communication devices using wireless signals. A UE needs to be awake to monitor for communications from a network. The UE also attempts to increase battery life by going to sleep to save power. To balance monitoring for communications and saving power, the UE uses DRX, where it cycles between an awake mode to check for communications and a sleep mode to save power.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide for transmitting a CSI report on a transmission occasion. For example, embodiments can provide an apparatus and method for transmission of CSI reports during DRX. According to a possible embodiment, a WUS monitoring configuration can be received from a network. A DRX mode configuration comprising at least an active period can be received. At least one CSI reporting configuration can be received. The at least one CSI reporting configuration can configure transmission occasions for transmission of at least one CSI report to the network outside the active period. A time offset configuration for CSI transmission outside the active period can be received. A CSI report can be transmitted on a transmission occasion of the configured transmission occasions. The transmission occasion can be within the configured time offset from a WUS monitoring occasion. The WUS monitoring occasion can be outside the active period.

Figure 1:
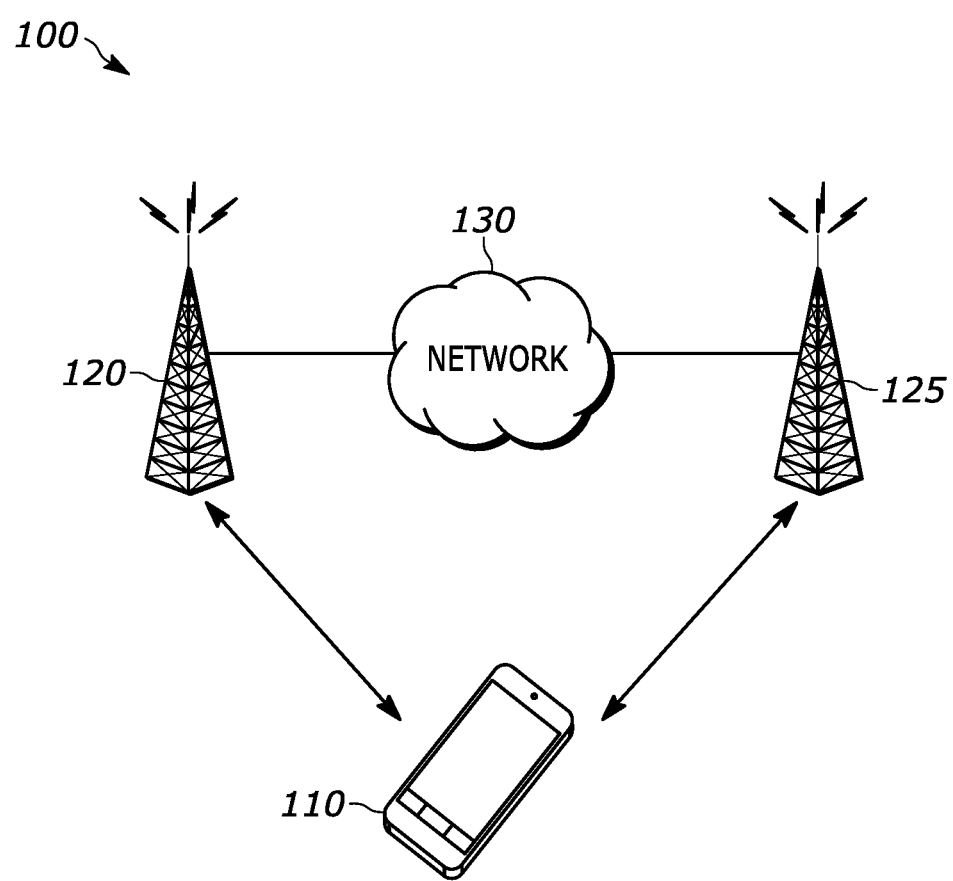
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an IoT device, or any other user device that is capable of sending and receiving communication signals on a wireless network. The at least one network entity 120 and 125 can be a wireless wide area network base station, can be a NodeB, can be an eNB, can be a gNB, such as a 5G NodeB, can be an unlicensed network base station, can be an access point, can be a base station controller, can be a network controller, can be a TRP, can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a TDMA-based network, a CDMA-based network, an OFDMA-based network, an LTE network, a NR network, a 3GPP-based network, a 5G network, a satellite communications network, a high-altitude platform network, the Internet, and/or other communications networks.

In operation, the UE 110 can communicate with the network 130 via at least one network entity 120. For example, the UE 110 can send and receive control signals on a control channel and user data signals on a data channel.

In 3GPP NR Rel-15, when the UE is not indicated to wake up, the drx_OnDurationTimer does not start. The UE does not perform CSI report and SRS transmission when drx_OnDurationTime does not start. If drx_OnDurationTimer does not start for a long time, UE might not get the DL/UL channel state information. There are at least two possible options for dealing with this issue of reporting CSI report outside of the drx_OnDurationTime. In one option, it has been discussed to dynamically indicate whether CSI reporting is enabled or not in the DCI format 2_6. In another option, semi-static configuration of enabling CSI reporting is proposed. Eventually, it has been agreed in Rel-16 to adopt the semi-static configuration for enabling CSI reporting when DRX is configured and also UE is configured to monitor DCI format 2_6 and higher layer parameter ps-TransmitOtherPeriodicCSI.

Figure 2:
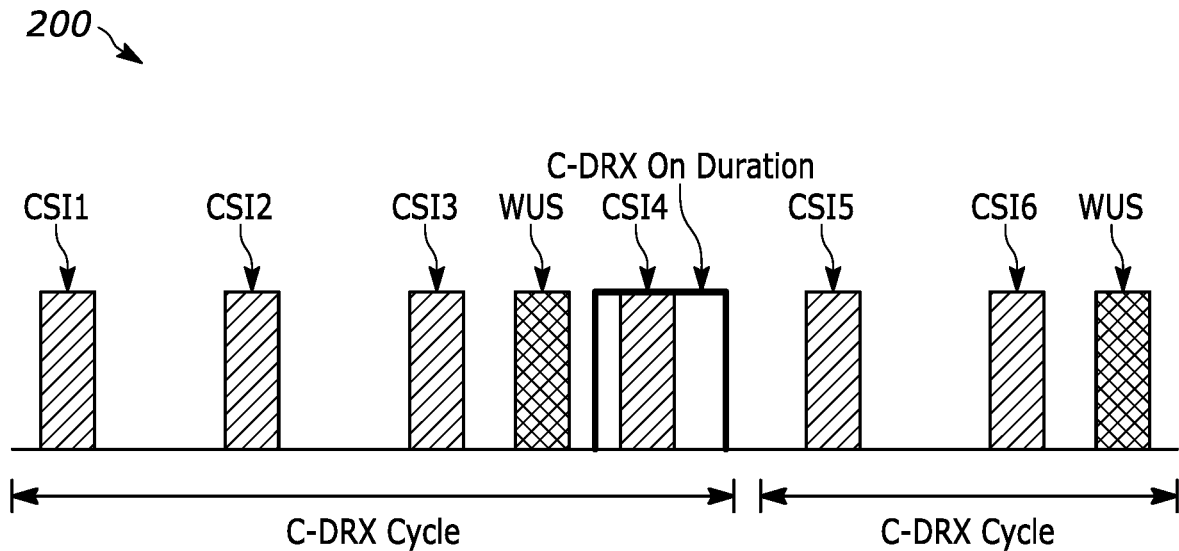
FIG. 2 is an example illustration of CSI reporting with WUS in DRX according to a possible embodiment.

FIG. 2 is an example illustration 200 of CSI reporting with WUS in DRX according to a possible embodiment. The illustration 200 shows how the adopted solution is not optimal in terms of power saving because such higher layer configuration would require UE to report the periodic CSI in all the transmission occasions during the DRX sleep period (CSI1, CSI2 and CSI3 in one C-DRX cycle). One possibility can be having reduced periodicity, but that might not be sufficient to provide report based on updated channel measurements.

For DCI Format 2_6—WUS, according to section 7.3.1.3 of 3GPP TS 38.212, new DCI format has been introduced for dynamic wake-up signal indication when a UE is configured with DRX where DCI format 2_6 is used for notifying the power saving information outside DRX Active Time for one or more UEs. The following information is transmitted by means of the DCI format 2_6 with CRC scrambled by PS-RNTI: block number 1, block number 2, . . . , block number N, where the starting position of a block is determined by the parameter PSPositionDCI2-6 provided by higher layers for the UE configured with the block.

If the UE is configured with higher layer parameter PS-RNTI and dci-Format2-6, one block is configured for the UE by higher layers, with the following fields defined for the block: Wake-up indication—1 bit; SCell dormancy indication—0 bit if higher layer parameter Scell-groups-for-dormancy-outside-active-time is not configured; otherwise 1, 2, 3, 4 or 5 bits bitmap determined according to higher layer parameter Scell-groups-for-dormancy-outside-active-time, where each bit corresponds to one of the SCell group(s) configured by higher layers parameter Scell-groups-for-dormancy-outside-active-time, with MSB to LSB of the bitmap corresponding to the first to last configured SCell group.

The size of DCI format 2_6 is indicated by the higher layer parameter SizeDCI_2-6, according to Clause 10.3 of [5, TS 38.213].

For DRX in RRC Connected mode in NR, when the UE is in RRC CONNECTED mode, the network can configure a UE with so called DRX configuration, which tells the UE when it should monitor its control channel, such as PDCCH. Without DRX being configured, UE needs to monitor PDCCH continuously, which causes high UE battery consumption and DRX allows power savings in the UE. How exactly the UE monitors PDCCH is controlled by various timers configured by the network.

Figure 3:
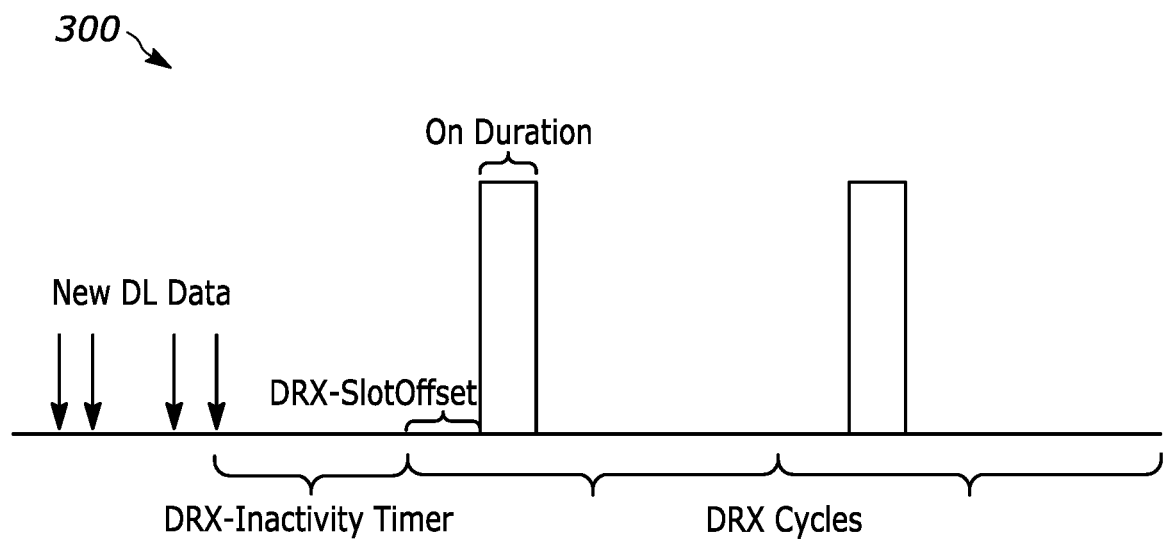
FIG. 3 is an example illustration of basic DRX operation according to a possible embodiment.

FIG. 3 is an example illustration 300 of basic DRX operation according to a possible embodiment. Within a DRX configuration, UE is provided with a setting of time interval called "DRX short cycle" or "DRX long cycle". For simplicity we call it "DRX cycle" in the following description as the rules of operation are similar. Within each "DRX cycle" there is an "ON duration" during which the MAC entity of the UE needs to monitor PDCCH. The drx-onDurationTimer describes the duration of the "ON duration" and drx-SlotOffset defines the delay from the start of the "DRXcycle" before starting the drx-onDurationTimer. The "DRX cycle" is started if UE has not received a new DL assignment or UL grant for a period of time defined by drx-InactivityTimer which is started/restarted every time PDCCH indicates a new transmission.

The other DRX timers are related to HARQ and corresponding retransmissions. These timers are per HARQ process and also affect when the UE needs to monitor PDCCH and when it can save battery. An example of the usage of HARQ related timers is the following: When a MAC PDU is received in a configured downlink assignment, the drx-HARQ-RTTTimerDL is started for the corresponding HARQ process in the first symbol after the end of the corresponding transmission carrying the DL HARQ feedback. If neither drx-InactivityTimer nor drx-onDurationTimer are running, the UE does not have to monitor PDCCH. If drx-HARQ-RTT-TimerDL expires and if the data of the corresponding HARQ process was not successfully decoded, the drx-RetransmissionTimerDL is started and UE needs to monitor PDCCH.

The UE may also receive a DRX Command MAC CE or a Long DRX Command MAC CE. When the UE receives either of the MAC CEs, it starts using short DRX cycle or long DRX cycle depending on which MAC CE was received and whether short DRX was configured for the UE. If the UE is not configured with short DRX cycle and receives a DRX Command MAC CE, UE starts the long DRX cycle. The reason to have both short and long DRX is to balance between power saving in the UE and the delay related to delivering uplink or downlink data when it becomes available.

For further power consumption optimizations, the network may configure the UE to limit CSI reporting to only ON durations of the DRX. However, the MAC entity transmits HARQ feedback and aperiodic SRS when such is expected regardless of PDCCH monitoring. It is worth noting that in EN-DC, separate DRX configurations are provided for MCG and SCG, but to allow for maximum power consumption optimizations at the UE, Master Node and Secondary Node can exchange and coordinate DRX configurations they provide to the UE.

For CSI reporting framework in NR, in a CSI framework, UE can be configured with N≥1 CSI Report Settings (CSI-ReportConfig) and M≥1 Resource Setting (CSI-ResourceConfig). The CSI Report Setting defines the content of the CSI report, such as what CSI parameters to fed back, their frequency-granularity, the CSI hypothesis that shall be assumed as well as the time-domain behavior of the CSI report. A CSI Report Setting is also associated with a certain carrier and thus multiple CSI Report Settings needs to be configured to enable multi-carrier CSI reporting for CA.

The Resource Setting on the other hand can be seen as a container to logically group the resources for channel and/or interference measurement that is intended to be used for a certain purpose. The Resource Setting is associated with measurement resources for a certain BWP. Two types of Resource Settings can be configured, either based on NZP CSI-RS resources or on CSI-IM resources. The NZP CSI-RS is a reference signal that enables the UE to estimate the coherent channel of the antenna port over which the CSI-RS is conveyed, and the configuration of CSI-RS resource indicates both which REs the RS is transmitted on as well as the RS sequence used. The CSI-IM resource on the other hand defines only a number of REs where the UE is supposed to perform non-coherent measurement of the received interference power. It is also possible to include SSB Resources in a Resource Setting to enable beam reporting.

A Resource Setting is also associated with a time-domain behavior, which can be periodic, semi-persistent or aperiodic, and all CSI-RS/CSI-IM resources with a Resource Setting have the same time-domain behavior. Periodic CSI-RS/CSI-IM resource are assumed to be always active and present once they have been configured to the UE via dedicated RRC signaling, and a periodic CSI-RS/CSI-IM resource is therefore associated with a periodicity and slot offset, indicating the time-domain position. A semi-persistent (SP) CSI-RS/CSI-IM resource is also configured with a periodicity and slot offset similar to the periodic resource but is assumed to be inactivated when first configured by RRC. To activate the CSI-RS/CSI-IM resource, an activation command needs to be transmitted using a MAC CE message, and upon receiving such an activation command, the UE assumes that the SP CSI-RS/CSI-IM resource is active and present until a MAC CE deactivation command is received. An aperiodic CSI-RS/CSI-IM resource is only present when explicitly triggered by DCI and constitutes a one-shot measurement.

Typically, periodic and semi-persistent resources are used when the resources are intended to be shared by multiple UEs in the cell, i.e., to encompass cell-specific measurements. Also, periodic and semi-persistent resources are used to give the opportunity for the UE to perform filtering of the measurements across multiple time-instances to improve the measurement accuracy. Aperiodic resources, on the other hand, are primarily used when each resource is UE-specific, such as when applying UE-specific beamforming on the CSI-RS, conducting aperiodic beam sweeping, or to evaluate a short-term transmission hypothesis.

The CSI-RS/CSI-IM resources are not directly defined in the Resource Setting but are first logically grouped into S≥1 CSI-RS Resource Sets (or S≥1 CSI-IM Resource Sets). In fact, all available CSI-RS/CSI-IM resources are first defined and configured as lists on a top-level in CSI-MeasConfig, which can be seen as a resource pool. The CSI-RS/CSI-IM resource indices are then configured in the definition of the Resource Sets, which implies that a CSI-RS/CSI-IM resource may be present in multiple Resource Sets, which enables for instance efficient sharing of resources from the resource pool between different UEs. Only a single Resource Set within a Resource Setting is used for measurement for a certain CSI report, and in fact, periodic/semi-persistent Resource Settings can only contain a single Resource Set (i.e. S=1). In that case, the Resource Setting structure serves no functional purpose. However, for aperiodic Resource Settings, multiple (up to S=16) Resource Sets can be defined and which Resource Set is to be used for a certain aperiodic measurement and report is indicated in the aperiodic trigger state.

The Resource Settings thus describe the measurement resources while the CSI Report Settings describe the CSI calculations and reporting format that are to be applied on the measurements. To accomplish this, each CSI Report Setting refers, or links to, one or more Resource Setting(s) for either channel or interference measurement. This can be done in a number of ways depending on which mode of CSI is configured and a CSI Report Setting can be linked with either one, two or three Resource Settings. For beam management operations using P2 or P3 beam sweeping, only channel measurements are needed and thus, the corresponding CSI Report Setting is linked with a single NZP CSI-RS based Resource Setting for channel measurement. For other types of, regular, CSI reports, both channel and interference measurement are required, and the corresponding CSI Report Setting is linked with one NZP CSI-RS based Resource Setting for channel measurement and one CSI-IM based Resource Setting for interference measurement. A new functionality in NR, compared to LTE, is the support of NZP CSI-RS based interference measurement. In this case, the corresponding CSI Report Setting is additionally linked with one NZP CSI-RS based Resource Setting for interference measurement (in addition to the two linked Resource Settings for the regular CSI report), meaning that the UE measures interference on both CSI-IM resource (typically inter-cell interference) and NZP CSI-RS resources (typically intra-cell interference). It is also possible to only configure a single NZP CSI-RS based Resource Setting for interference measurement purpose, whereby the UE needs to estimate inter-cell interference from the residuals of the NZP CSI-RS.

When only CSI-IM based interference measurement is utilized, there is a one-to-one mapping between the NZP CSI-RS resources in the Resource Set for channel measurement and the CSI-IM resources in the Resource Set for interference measurement that is used for a certain CSI report. Each pair of (NZP CSI-RS resource, CSI-IM resource) thus constitute a channel/interference hypothesis. Typically, though, when multiple such resources are configured in the Resource Set, the gNB is only interested in probing different channel hypotheses whereby the multiple CSI-IM resource in the Resource Set are duplicates of the same resource. For NZP CSI-RS based interference measurement, it is only possible to configure a single NZP CSI-RS resource in the Resource Set for channel measurement and a single CSI-IM. This implies that the UE cannot perform any channel/interference hypothesis selection. However, multiple NZP CSI-RS resources for interference measurement can be configured, where each resource typically corresponds to the precoded channel of a hypothetical co-scheduled UE. In this case, the multiple configured resources shall all be accounted for as part of a single channel/interference hypothesis, i.e., there is a one-to-many mapping between channel and interference measurement resources.

The CSI Report Settings are also configured with a time-domain behavior, which can be either periodic, semi-persistent, or aperiodic, and defines on which time occasions the associated CSI report is to be transmitted.

Periodic CSI reports can only be transmitted on PUCCH, as resources for PUSCH need to be dynamically indicated, whereas the PUCCH resource to be used to convey the periodic CSI report can be preconfigured. As PUCCH resources are defined for each UL BWP, which can be dynamically switched, each periodic CSI Report Setting is configured with an associated PUCCH resource for each UL BWP candidate. Typically, periodic CSI reports are configured with a relatively longer reporting periodicity and only intended to give a coarse wideband, CSI to be used for initial packet scheduling or PDCCH link adaptation. Once the UE has more data to be transmitted, finer granular CSI can be requested using semi-persistent or aperiodic reporting. Similar to periodic CSI-RS/CSI-IM resources, a periodic CSI report is activated once the UE receives the corresponding RRC configuration.

Semi-persistent CSI reports can be transmitted either on PUCCH or PUSCH. PUCCH-based SP-CSI reporting, is similar to periodic CSI reporting except that the SP-CSI reports need to be activated (and deactivated) via a MAC CE command. PUSCH-based SP-CSI reporting on the other hand is activated by DCI, implying that the resource allocation can be changed dynamically, which enables the gNB to perform more adaptive link adaptation of the CSI report or adapt to varying CSI payload. This is not possible to the same extent for PUCCH-based CSI reporting since the PUCCH resource is pre-configured.

Aperiodic CSI reports can only be carried on the PUSCH and constitute a one-shot report which is typically triggered whenever the gNB requires up to date fine granular CSI. PUSCH has much larger payload capacity compared to PUCCH and can therefore carry the more heavy-weight subband CSI and even multiple CSI report in case CA operation is used (the longer PUCCH Formats 3&4 also has capacity for subband CSI reporting, but to a much lower extent than PUSCH). In typical operations, aperiodic CSI reports are triggered by an UL DCI that also schedules UL-SCH data transmission, whereby the CSI reports are multiplexed with the data on the same PUSCH transmission, but it is also possible to transmit only CSI without data (by setting the UL-SCH flag in DCI Format 0_1 to zero).

The time-domain behavior of the CSI Report Setting must have the same or more dynamic time-domain behavior than the associated Resource Settings. That is, periodic CSI reporting can only be done based on periodic CSI-RS/CSI-IM resources, whereas semi-persistent reporting can be done on either periodic or semi-persistent resources and aperiodic reporting can be done on resources with any time-domain behavior. This makes sense, since otherwise the report may need to be done on resources which have not yet been activated or triggered, which would result in an error case. To reduce the number of possible configuration combinations, there is a restriction that all associated Resource Settings for a CSI Report Setting needs to have same time-domain behavior.

For CSI reporting in DRX with WUS, according section 5.1.6.1 of 3GPP TS 38.214, the following procedure is adopted for CSI reporting in DRX when the UE is configured WUS and higher layer signalling to enable periodic CSI reporting: If the UE is configured with DRX, if the UE is configured to monitor DCI format 2_6 and configured by higher layer parameter ps-TransmitOtherPeriodicCSI to report CSI with the higher layer parameter reportConfigType set to 'periodic' and reportQuantity set to quantities other than 'cri-RSRP' and ssb-Index-RSRP' when drx-onDurationTimer is not started, the most recent CSI measurement occasion occurs in DRX active time or during the time duration indicated by drx-onDurationTimer also outside DRX active time for CSI to be reported; if the UE is configured to monitor DCI format 2_6 and configured by higher layer parameter ps-TransmitPeriodicL1-RSRP to report L1-RSRP with the higher layer parameter reportConfigType set to 'periodic' and reportQuantity set to cri-RSRP when drx-onDurationTimer is not started, the most recent CSI measurement occasion occurs in DRX active time or during the time duration indicated by drx-onDurationTimer also outside DRX active time for CSI to be reported; otherwise, the most recent CSI measurement occasion occurs in DRX active time for CSI to be reported.

According to current specified behaviour, CSI reporting is either power consuming since it is done periodically even if the channel conditions do not change often or triggered by a specific DCI field in non fallback uplink formats. In the other case, when the gNB has data to send to the UE after a long inactive period, it sends a WUS to the UE in order to inform it that it has scheduled data and has to wake-up and starts the DRX OnDuration timer for the next DRX cycle. At this stage no CSI reporting has been asked from the UE unless it is configured with semi-persistent or periodic CSI-RS. The CSI-RS is triggered by downlink scheduling assignment and uplink grant DCI formats, which makes channel conditions unknown to the network until triggered by the corresponding DCI formats. Once channel conditions are reported, the data can be scheduled on resources that better fits the channel conditions.

At least some embodiments can provide more efficient CSI report procedures and signalling that allow to receive updated channel measurement reports, while at the same time maintain low power consumption.

Figure 4:
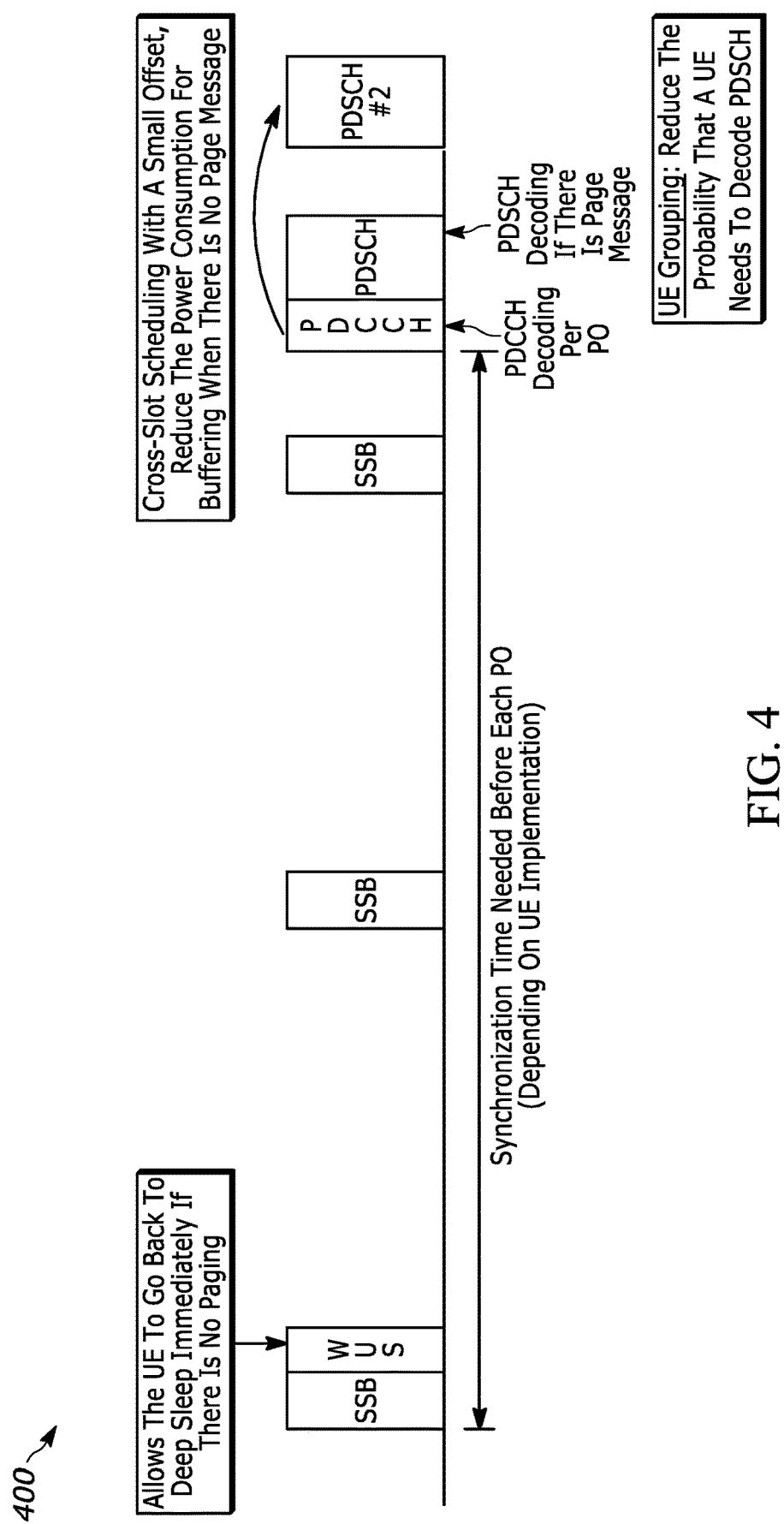
FIG. 4 is an example illustration of options for paging according to a possible embodiment.

FIG. 4 is an example illustration 400 of three potential options for paging according to a possible embodiment. A wake-up signal can be used for the case where a UE needs to wake up a long time in advance for synchronization purpose for a PO reception. The concept is very similar to the WUS for connected-mode UEs introduced in Rel-16, or WUS in NB-IoT. If a UE receives a wake-up signal with negative indication, it does not wake up in the corresponding PO. Otherwise, it continues with the normal procedure for PO reception. For the paging cycles with negative wake-up indication, the UE does not need to perform the long-time synchronization that consumes a significant amount of power, or the paging PDCCH/PDSCH decoding.

For potential paging enhancements, the following candidate schemes are being studied: On scheme is paging early indication before a target PO to indicate UE whether to monitor PDCCH scrambled with P-RNTI at the PO. Potential candidate indication methods include DCI-based indication, e.g., based on extending existing DCI format 1_0 or 2_6 and/or a new DCI format. Also, RS-based or sequence-based indication, e.g., based on TRS/CSI-RS or SSS. Another scheme is sub-grouping for paging, based on legacy paging DCI, paging early indication, additional reception occasions in time/frequency domain, and/or multiple P-RNTIs. Another scheme is cross-slot scheduling for paging PDSCH.

Paging enhancement, 1, 2, or 3 SS burst processing is assumed before PO is also being studied. One or more values (1, 2, or 3) can be chosen for the evaluations. New types/patterns of TRS/CSI-RS are not introduced specifically for idle/inactive mode UE.

The TRS/CSI-RS occasion(s) that may be for connected mode UEs can be shared to idle/inactive mode UEs. It is understood that gNB can potentially share the occasions to idle/inactive (which would just mean it up to the network whether to share or not share). It is understood that TRS/CSI-RS in the TRS/CSI-RS occasion(s) may or may not be transmitted. Always-on TRS/CSI-RS transmission by gNodeB is not required. At least TRS/CSI-RS occasion(s) corresponding to periodic TRS is supported. Other RS types and whether UE blind detection is required or not can be studied.

Idle/inactive UE may use the TRS/CSI-RS occasion(s) that are shared to it for functionalities, such as AGC and/or time/frequency tracking. RRM measurement for serving cell, RRM measurement for neighbor cell, paging reception indication can also be studied.

It is up to gNB implementation whether or not to transmit a TRS/CSI-RS to idle/inactive UEs even when the TRS/CSI-RS is not needed by connected UEs (e.g., when there is a connected mode UE in a cell but the UE is no longer using the TRS/CSI-RS, or when there is no longer connected mode UE in a cell, etc.)

The configuration of TRS/CSI-RS occasion(s) for idle/inactive mode UE(s) is provided by higher layer signalling. Higher layer signalling candidates (e.g., SIB, dedicated RRC, RRC release message, etc.) can be chosen. Other signalling candidates (e.g., pre-configuration, etc.) can be chosen. Detailed configuration parameters (e.g., whether and how to reduce the signalling overhead for configuration, etc.) can be chosen.

Whether and how to inform the availability of TRS/CSI-RS to idle/inactive mode UE (implicitly or explicitly) can also be determined. Availability corresponds to the information for whether TRS/CSI-RS is actually transmitted or not.

Figure 5:
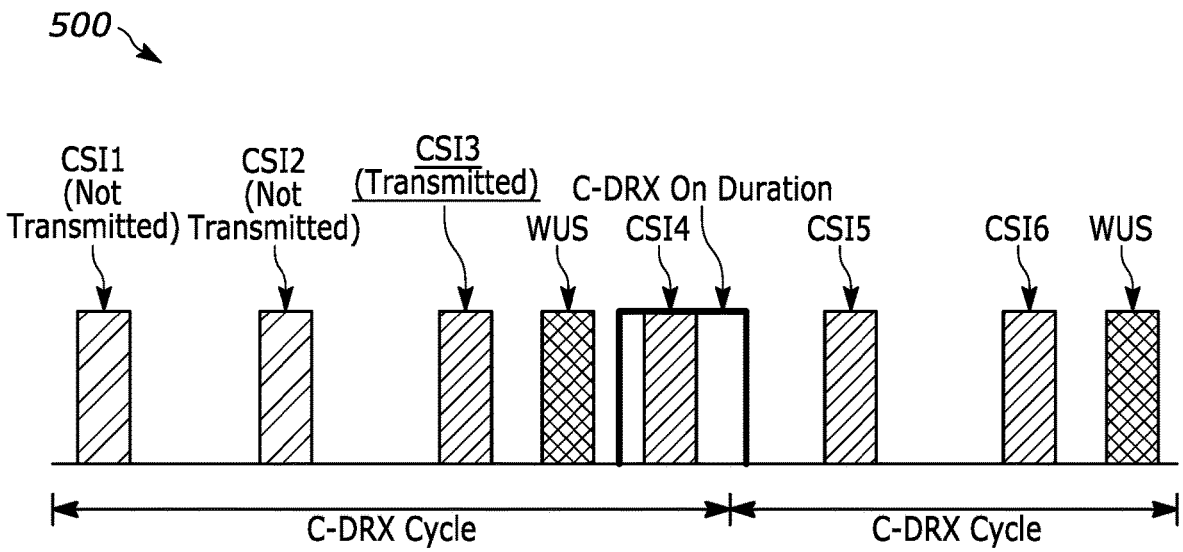
FIG. 5 is an example illustration of selective transmission of CSI report in DRX mode according to a possible embodiment.

FIG. 5 is an example illustration 500 of selective transmission of CSI report in DRX mode according to a possible embodiment. At least some embodiments can enable periodic and/or semi-persistent CSI report(s) on selective transmissions occasions outside the active period of a UE, when UE is in DRX sleep and configured to monitor WUS (such as DCI format 2_6), as shown in the illustration 500. Only CSI3 before WUS is transmitted. The transmission of aperiodic and/or semi-persistent CSI reports on selective transmission occasions imply that only a subset of the transmission occasions are activated (or alternatively deactivated) among all the transmissions occasions configured to the UE by network (gNB). The selective activation (or alternatively deactivation) is based on at least the timing relation of the periodic/semi-persistent with WUS monitoring occasions.

At least some embodiments can further reduce the power consumption related to CSI reporting in DRX mode, while allowing up-to-date transmissions of CSI report based on latest transmissions.

According to a possible embodiment, a UE can activate semi-persistent CSI reporting within a DRX sleep period upon reception of WUS (DCI 2_ 6). The semi-persistent CSI reporting activation is for the N preconfigured transmission occasions following the WUS.

According to a possible embodiment, the semi-persistent CSI report activation can be introduced as a new one bit field in the DCI 2_6, where a bit '1' indicates the activation of semi-persistent CSI report. In another implementation, a bitmap of CSI reporting actual transmission occasions from the configured candidate transmission occasion can be signalled in DCI 2_6. In another implementation, SRS transmission triggering/activation of semi-persistent SRS transmission can be signalled in DCI 2_6, details of which are explained below. In this case, in order to maintain the DCI size budget criteria, the DCI 2_6 can be size aligned.

In another implementation, SRS transmission occasion can be configured for a UE in the DRX sleep period when a UE is configured to monitor WUS and then the UE can choose to selectively transmit SRS in one of the transmission occasions such that UL SRS is being transmitted to the gNB using an Tx beam/TCI state corresponding to the Rx beam in which WUS is received. In this method, when a UE supports beam correspondence, the UE can select the suitable Tx beam for transmission of SRS based on the Rx beam that is used to receive WUS as a feedback to gNB to inform the gNB of that beam information that is used for the reception of WUS.

The UE can choose to monitor PDCCH in a Rx beam/TCI state in the same CORESET/Search spaces in the next DRX on-period that is used for the reception of WUS.

At least some embodiments can provide for selective activation of semi-persistent CSI based on WUS monitoring occasion.

Figure 6:
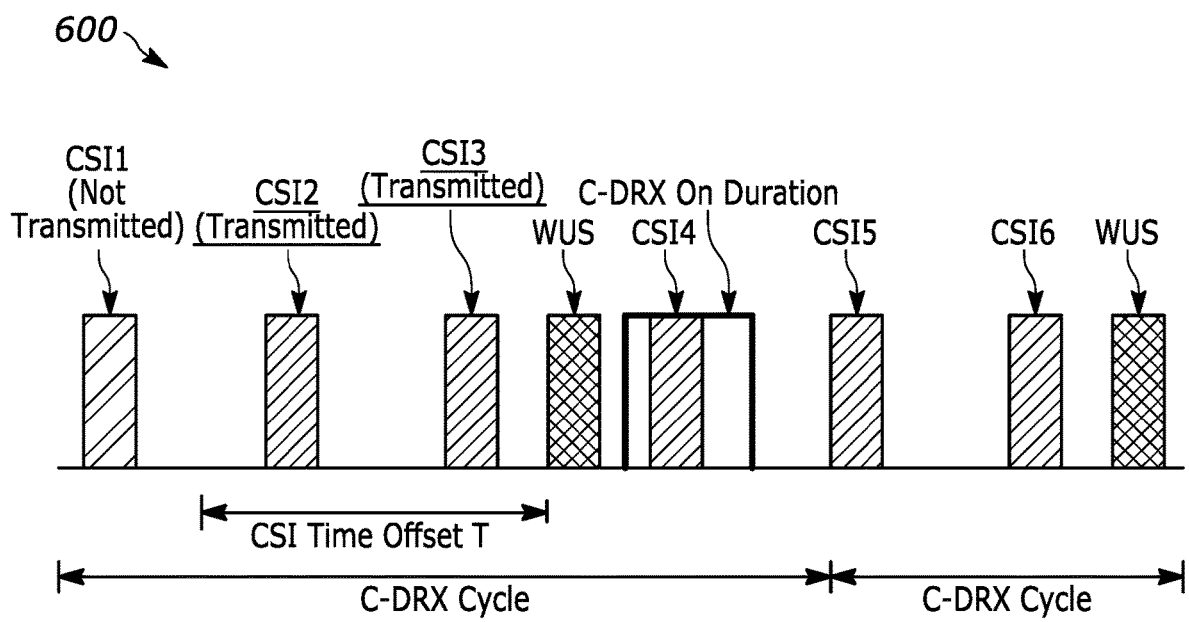
FIG. 6 is an example illustration of selective transmission of CSI report in DRX mode based on single CSI time offset according to a possible embodiment.

FIG. 6 is an example illustration 600 of selective transmission of CSI report in DRX mode based on single CSI time offset T according to a possible embodiment. When UE is in DRX mode, configured to monitor WUS and also configured with semi-persistent CSI reporting, then UE can assume implicit activation of the semi-persistent CSI report on all the transmission occasions that are within time offset T (configured by network) before the beginning of WUS monitoring occasions, as shown in the illustration 600. Only CSI2 and CSI3 are transmitted since they are within the CSI time offset T before the start of the WUS monitoring occasion. Here, the UE reports CSI reports containing CRI-RSRP of the best beam at a time offset compared to the WUS monitoring occasion and the gNB can transmit WUS in a DL beam according to the CSI report. In one implementation of this embodiment, the UE can assume implicit activation only when it is semi-statically configured with implicit activation of semi-persistent CSI reporting in DRX mode.

Figure 7:
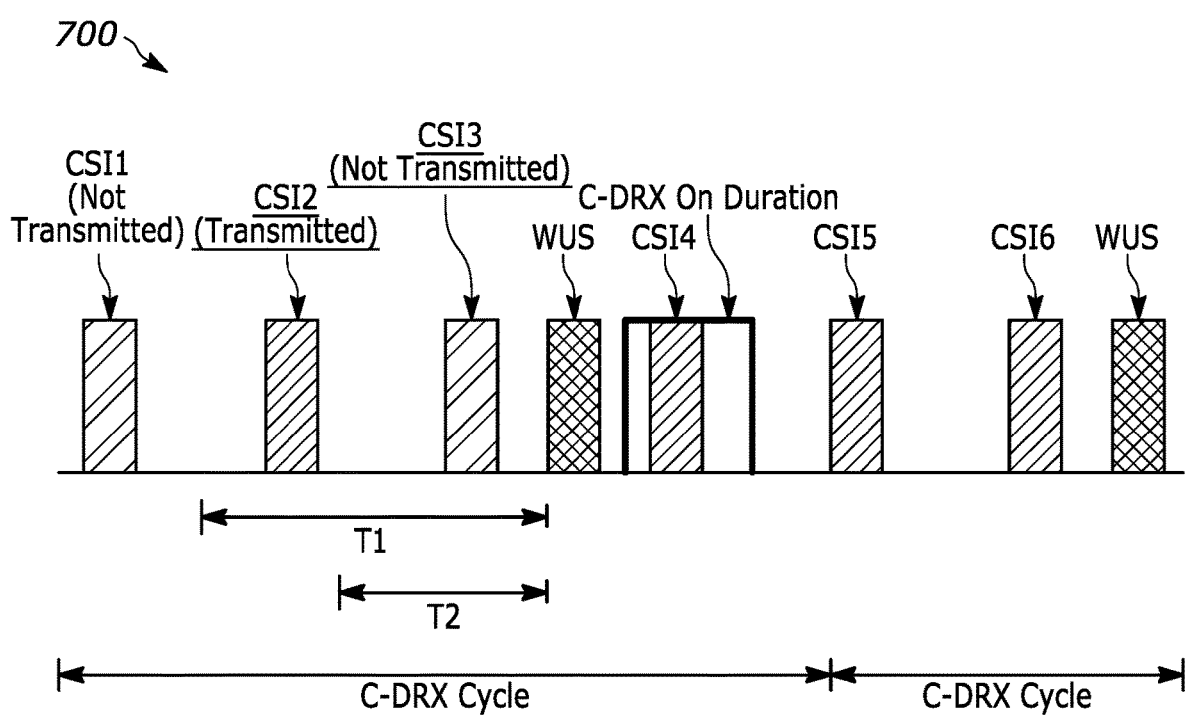
FIG. 7 is an example illustration of selective transmission of CSI report in DRX mode based on two CSI time offsets according to a possible embodiment.

FIG. 7 is an example illustration 700 of selective transmission of CSI report in DRX mode based on two CSI time offsets, T1 and T2, according to a possible embodiment. The two timing offsets, T1 and T2, are configured by the network, where the UE can assume implicit activation of the semi-persistent CSI report on all the transmission occasions that are maximum T1 time unit before the starting of WUS monitoring occasions, but minimum T2 time unit before the starting of WUS monitoring occasions, as shown in the illustration 700. Only the CSI2 transmission occasion is within T1 and T2 timing offset before WUS. Configuring two offsets can allow consideration of the CSI report processing at the gNB and allow sufficient time for gNB to apply corresponding settings for the next WUS transmission, for example, transmission of WUS on best beam(s).

In another alternate implementation, the gNB can transmit WUS and/or CSI-RS using plurality of beams i.e., beam sweeping manner in different monitoring occasions and the UE can make use of CSI-RS reception for the correction of the Rx beam prior to the reception of WUS. If the UE successfully receives and decodes WUS in one of the monitoring occasions using one of the beams, then UE can selectively transmit CSI report in one of the transmission occasions after the successful reception of WUS to inform the gNB of the CRI-RSRP, which can be used to update the beam information of the PDCCH in the next on-duration timer.

Figure 8:
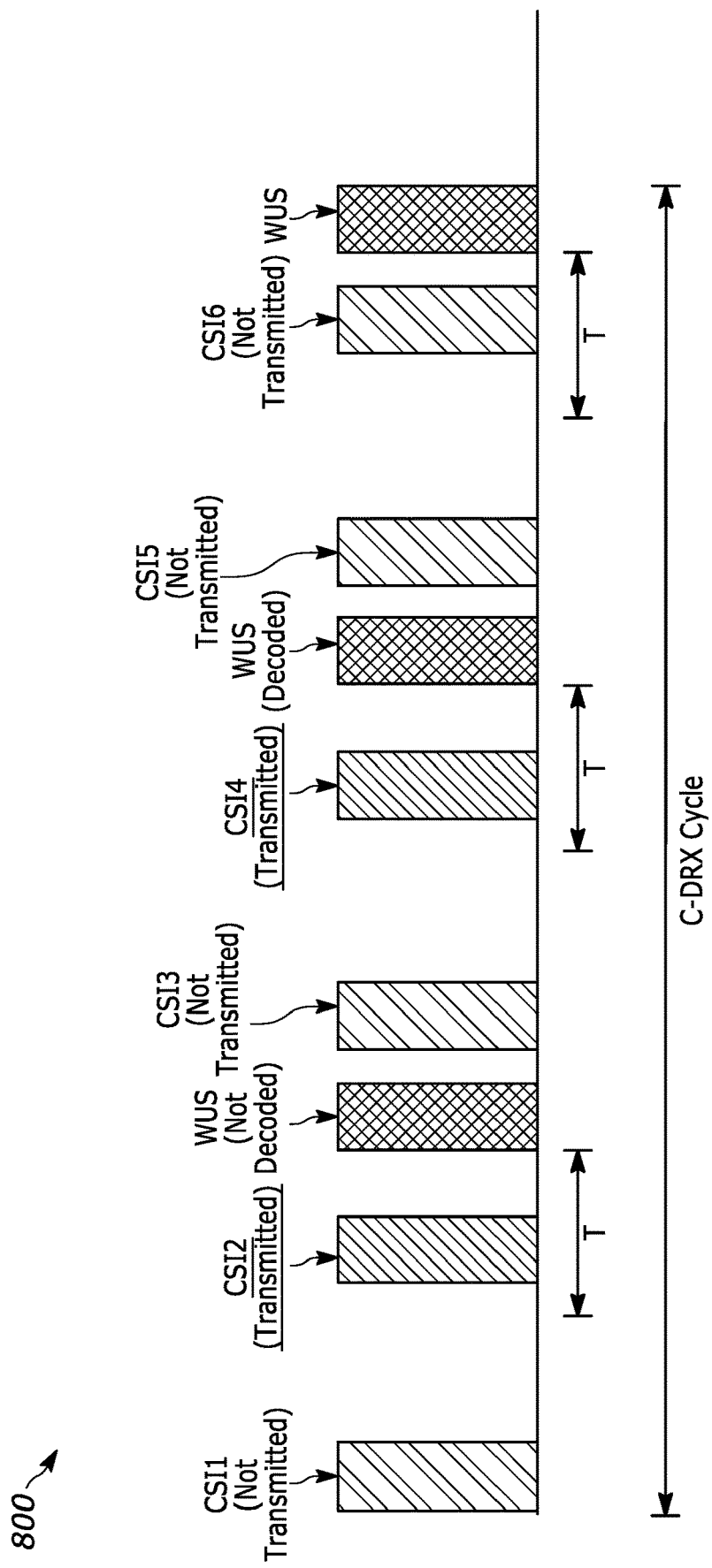
FIG. 8 is an example illustration of implicit deactivation of CSI report in DRX mode upon WUS decoding according to a possible embodiment.

FIG. 8 is an example illustration 800 of implicit deactivation of CSI report in DRX mode upon WUS decoding according to a possible embodiment. When the UE is in DRX mode, configured to monitor WUS, and also configured with semi-persistent CSI reporting, then the UE can assume implicit activation of the semi-persistent CSI report on all the transmission occasions that are within time offset T (configured by network) before the beginning of WUS monitoring occasions, but once the WUS monitoring occasion in a C-DRX cycle is successfully decoded by UE, then the UE can assume that all the remaining semi-persistent CSI reports within that C-DRX cycle are implicitly deactivated including those within time offset T of any subsequent WUS monitoring occasions within the sleep period of the current DRX cycle as shown in the illustration 800. Once the second WUS is decoded, then CSI report 6 is not transmitted, although it is within the time offset T of the next WUS monitoring occasion.

Figure 9:
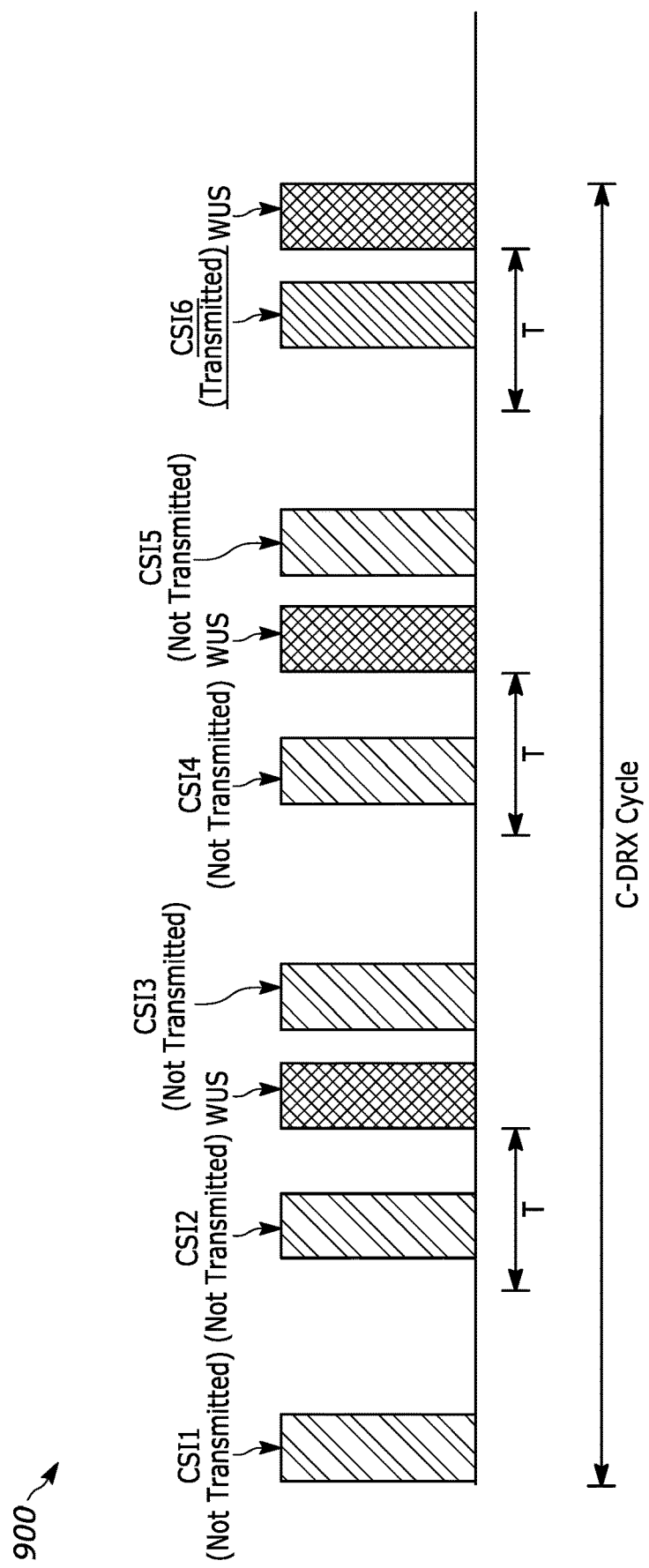
FIG. 9 is an example illustration of only one CSI report within a single C-DRX cycle according to a possible embodiment.

FIG. 9 is an example illustration 900 of only one CSI report within a single C-DRX cycle according to a possible embodiment. When the UE is in DRX mode, configured to monitor WUS, and also configured with semi-persistent CSI reporting, then the UE can assume implicit activation of the semi-persistent CSI report on one of the transmission occasions that are within time offset T (configured by network) before the beginning of the last WUS monitoring occasion within a C-DRX cycle, as shown in the illustration 900. In this embodiment, CSI6 is transmitted within the time offset T before the last WUS monitoring occasion within the C-DRX cycle.

In another embodiment, the UE transmits a CSI report on the last of the CSI transmission occasions within the sleep period of the DRX cycle. The CSI report can including the CRI-RSRP of the last decoded WUS and the corresponding CSI-RS.

Figure 10:
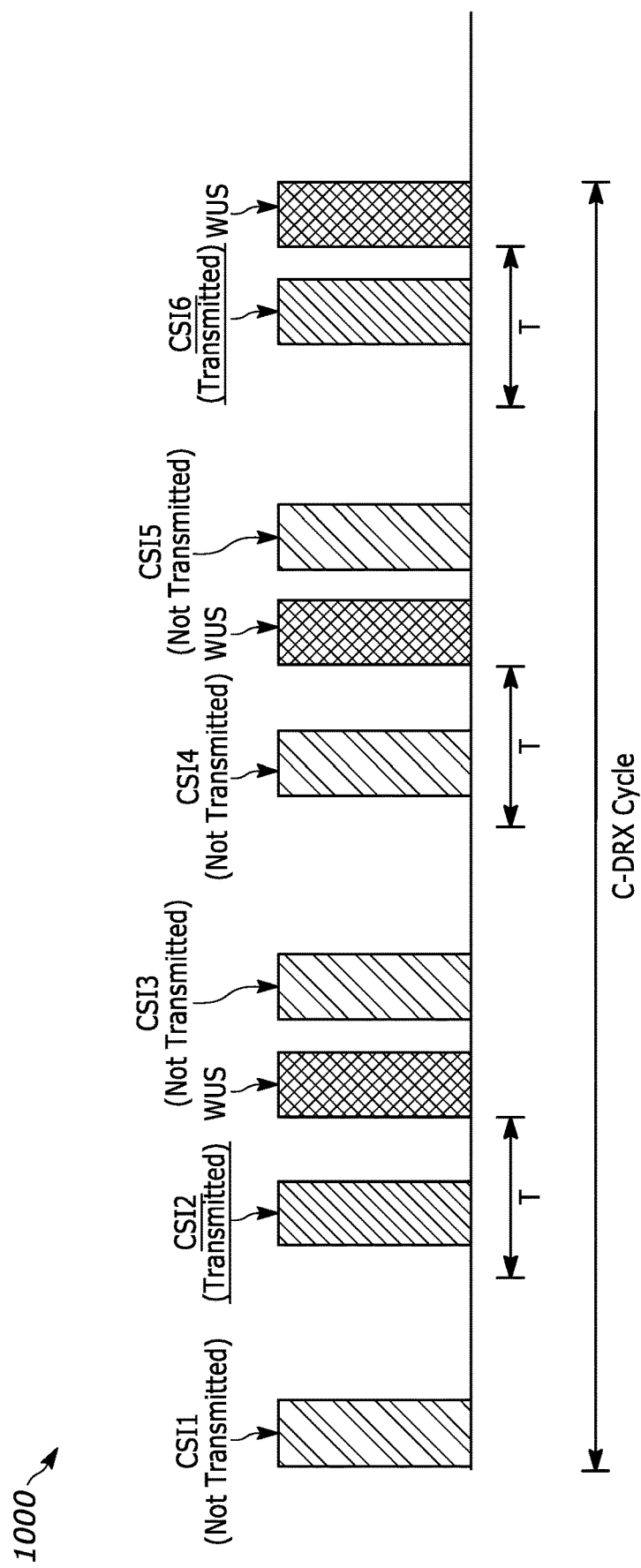
FIG. 10 is an example illustration of only one CSI report within a single C-DRX cycle according to a possible embodiment.

FIG. 10 is an example illustration 1000 of only one CSI report within a single C-DRX cycle according to a possible embodiment. When the UE is in DRX mode, configured to monitor WUS, and also configured with semi-persistent CSI reporting, then UE can assume implicit activation of the semi-persistent CSI report on transmission occasions that are within time offset T (configured by network) before the beginning of a sub-set of WUS monitoring occasions within a C-DRX sleep period. A sub-set of WUS monitoring occasions can be configured based on a periodicity to apply implicitly activation of semi-persistent CSI report, as shown in the illustration 1000. When a periodicity of 2 is configured, then the implicit activation is applied to the CSI report within the time offset T for every second WUS monitoring occasion within a C-DRX sleep period. Therefore, only CSI2 before the $1^{st}$ WUS occasion and CS6 before the $3^{rd}$ WUS occasions are transmitted (that are within the time offset T).

In another embodiment, the UE selective semi-persistent CSI reporting can be a function of WUS offset if a UE is configured with a WUS offset greater than certain configured offset value. For example, for larger WUS offset, then the semi-persistent CSI report can be implicitly activated for a subset of CSI report transmission occasions within the time offset T before a WUS monitoring occasion. In another method, the UE can selectively transmit CSI report in one of the transmission occasions that is before the WUS reception and as well as in the last transmission occasion in the sleep period. In another implementation, the UE can selectively transmit a CSI report after the successful reception of WUS only if there is any change from the last transmitted CSI report.

In another embodiment, the network can configure a CRI-RSRP report threshold such that the UE refrains from sending a CSI report if the CRI-RSRP is measured to be below this threshold.

In another embodiment for CSI reporting during DRX on-period for Redcap UEs, a similar approach of selective transmission of CSI report can be adopted by transmitting CSI reporting in a subset of transmission occasion and in another implementation, transmission of CSI report only if there is any change from the last transmitted CSI report otherwise if the CRI-RSRP is measured to be below certain configured threshold.

At least some embodiments can provide selective activation of semi-persistent CSI based on WUS monitoring occasion and reported quantity. When the UE is in DRX mode, configured to monitor WUS, and also configured with semi-persistent CSI reporting, then the UE can assume implicit activation of the semi-persistent CSI report that contains only specific CSI reporting quantities on the transmission occasions that are within time offset T (configured by network) before the beginning of WUS monitoring occasions. For example, a UE can be configured for reporting CSI report quantities only that contain at least CQI. If a report is not configured to send CQI, then it is not transmitted, even if it is within the required time offset T.

According to a possible implementation, two timing offsets T1 and T2 are configured by the network, where the UE can assume implicit activation of the semi-persistent CSI report that contains only specific CSI reporting quantities on all the transmission occasions that are maximum T1 time unit before the starting of WUS monitoring occasions, but minimum T2 time unit before the starting of WUS monitoring occasions. One or both of the timing offset values can be associated be specific reporting quantities. For example, if the CSI reports CRI-CQI-PMI, then timing value T1_1 and T2_1 can utilized, otherwise timing values T1_2 and T2_2 can be utilized for any other reporting quantities.

At least some embodiments can provide for selective deactivation of periodic CSI based on WUS monitoring occasion. When the UE is in DRX mode, configured to monitor WUS, and also configured with periodic CSI reporting, then UE can assume implicit deactivation of the periodic CSI report on all the transmission occasions that are outside the time offset T (configured by network) before the beginning of WUS monitoring occasions shown in the illustration 800.

In one implementation of this embodiment, the UE can assume implicit deactivation only when it is semi-statically configured with implicit deactivation of periodic CSI reporting in DRX mode. In another implementation, the UE can assume implicit deactivation when UE is also configured with higher layer parameter ps-TransmitOtherPeriodicCSI to report CSI with the higher layer parameter reportConfig-Type set to 'periodic'.

In another possible embodiment, two timing offsets T1 and T2 are configured by the network, where the UE can assume implicit deactivation of the periodic CSI report on all the transmission occasions that are before T1 time units before the starting of WUS monitoring occasions, and after T2 time units before the starting of WUS monitoring occasions.

At least some embodiments can provide for selective deactivation of periodic CSI based on WUS monitoring occasion and reported quantity. When the UE is in DRX mode, configured to monitor WUS, and also configured with semi-persistent CSI reporting, then the UE can assume implicit deactivation of the periodic CSI reports that are outside the time offset T before the beginning of WUS monitoring occasions and also the CSI reports other that contains only specific CSI reporting quantities on the transmission occasions that are within time offset T before the beginning of WUS monitoring occasions.

According to another possible embodiment, two timing offsets T1 and T2 are configured by the network, where the UE can assume implicit deactivation of the periodic CSI reports on all the transmission occasions that are maximum T1 time unit before the starting of WUS monitoring occasions, but minimum T2 time unit before the starting of WUS monitoring occasions and also all periodic reports other than with specific report quantities on transmission occasions within T1 and T2. One or both of the timing offset values can be associated be specific reporting quantities.

Figure 11:
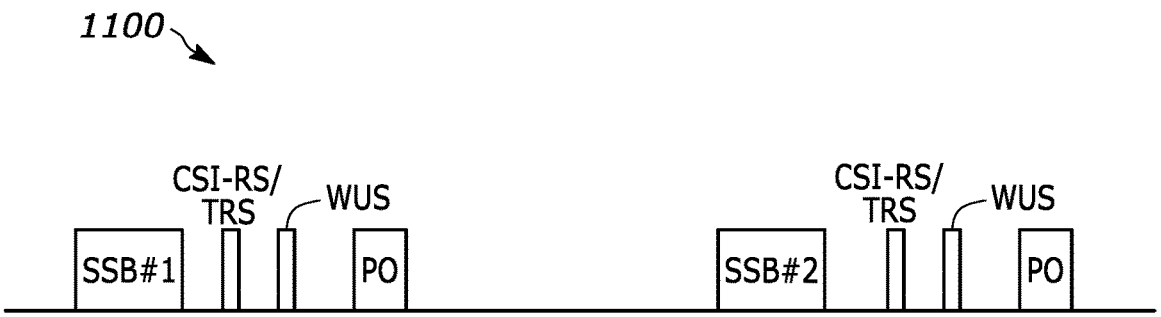
FIG. 11 is an example illustration of CSI-RS transmission along with WUS and PO for idle mode WUS reception according to a possible embodiment.

FIG. 11 is an example illustration 1100 of CSI-RS transmission along with WUS and PO for idle mode WUS reception according to a possible embodiment. Generally, the time taken for achieving synchronization from the SSB before decoding PDCCH and/or PDSCH in one of the paging occasions depends on the quality of the chipset. Hence, the low-quality chipset can take 2 or 3 SSB bursts to achieve synchronization before decoding paging related PDCCH and/or PDSCH, which makes the UE to be in the active reception mode for a longer time as shown in the illustration 1100. In this embodiment, UE can be configured with a block of SSB, CSI-RS/TRS, WUS, and PO. Additional RS such as CSI-RS/TRS can be configured between the SSB and WUS to improve the synchronization accuracy of reduced capability UEs for the successful reception of WUS. In a first implementation, the gNB can explicitly indicate the presence/absence of transmission of CSI-RS/TRS in the candidate location for the idle/inactive mode UEs using a field in DCI transmitted using CORESET 0. In this method, presence/absence of transmission of the CSI-RS/

TRS in the candidate location can be dynamically indicated to UEs monitoring each block of SSB, CSI-RS/TRS, WUS, and PO using CORESET 0. In a second implementation, the gNB can explicitly indicate the transmission of CSI-RS/TRS in the candidate location using PBCH payload. In another implementation, the gNB can implicitly indicate the transmission of CSI-RS/TRS in the candidate location using PBCH DMRS such that DMRS time/frequency offset can indicate the transmission of CSI-RS/TRS.

When UE receives an indication on the presence of transmission of CSI-RS/TRS in the candidate location explicitly/implicitly, then UE can keep the circuitry on for monitoring the CSI-RS/TRS, WUS, and/or PO. When the UE receives indication on the absence of the transmission of CSI-RS/TRS in the candidate location, then UE can switch off the circuitry and not monitor CSI-RS/TRS, but switch on the circuitry to monitor the WUS and/or PO, while in another implementation where the UE requiring additional RS to attain perfect synchronization, absence of the transmission of CSI-RS/TRS in the candidate location, the UE in this case can switch off the circuitry and not monitor CSI-RS/TRS, WUS, and/or PO in the current block and then UE can switch on the circuitry to monitor another block of SSB, CSI-RS/TRS, WUS and/or PO.

A CSI report containing feedback on CRI-RSRP/SSB index of the best beam that is used for the successful reception/decoding of paging message or WUS can be transmitted with Msg3 or MsgA using a PUSCH transmission that is transmitted along with the 2-step RACH procedure.

Figure 12:
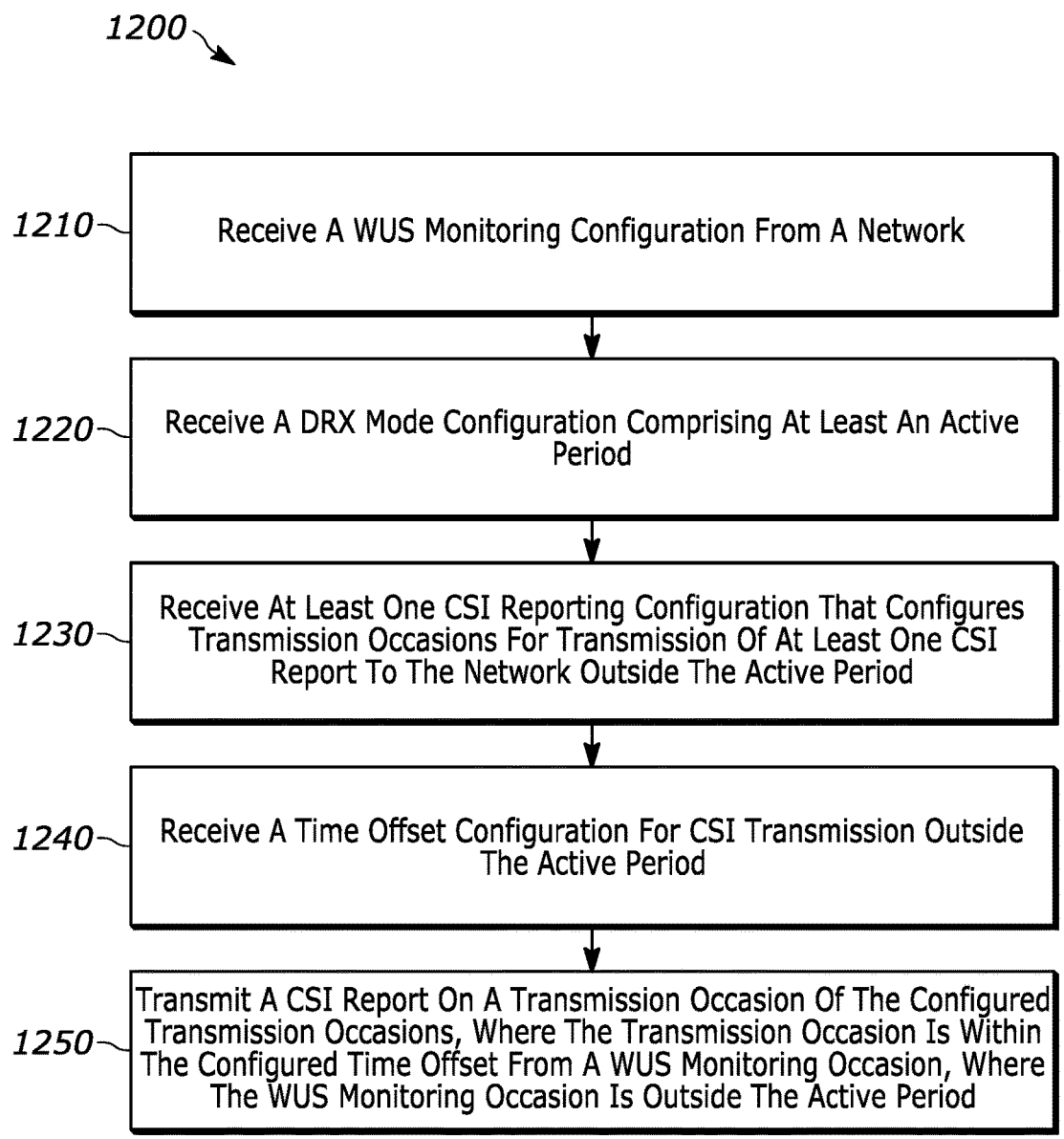
FIG. 12 is an example flowchart illustrating the operation of a wireless communication device according to a possible embodiment.

FIG. 12 is an example flowchart 1200 illustrating the operation of a wireless communication device, such as the UE 110, according to a possible embodiment. At 1210, a WUS monitoring configuration can be received from a network. At 1220, a DRX mode configuration comprising at least an active period can be received. At 1230, at least one CSI reporting configuration can be received. The at least one CSI reporting configuration can configure transmission occasions for transmission of at least one CSI report to the network outside the active period. At 1240, a time offset configuration for CSI transmission outside the active period can be received. At 1250, a CSI report can be transmitted on a transmission occasion of the configured transmission occasions. The transmission occasion can be within the configured time offset from a WUS monitoring occasion. The WUS monitoring occasion can be outside the active period.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, mobility management entity, or other network entity, can perform reciprocal operations of a UE. For example, the network entity can transmit signals received by the UE and can receive signals transmitted by the UE. The network entity can also process and operate on sent and received signals.

Figure 13:
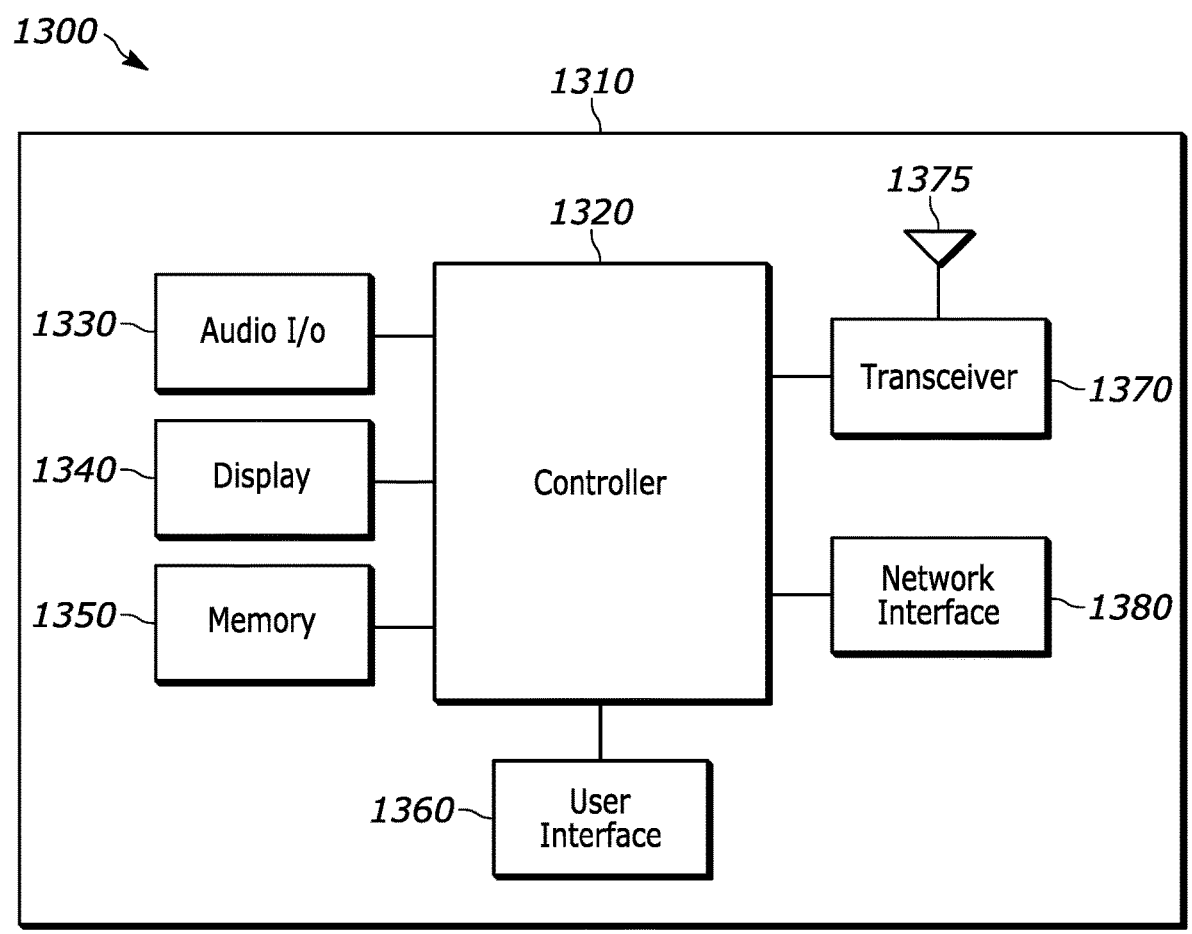
FIG. 13 is an example block diagram of an apparatus according to a possible embodiment.

FIG. 13 is an example block diagram of an apparatus 1300, such as the UE 110, the network entity 120, or any other wireless communication device disclosed herein, according to a possible embodiment. The apparatus 1300 can include a housing 1310, a controller 1320 coupled to the housing 1310, audio input and output circuitry 1330 coupled to the controller 1320, a display 1340 coupled to the controller 1320, a memory 1350 coupled to the controller 1320, a user interface 1360 coupled to the controller 1320, a transceiver 1370 coupled to the controller 1320, at least one antenna port 1375, such as at least one antenna, coupled to the transceiver 1370, and a network interface 1380 coupled to the controller 1320. The apparatus 1300 may not necessarily include all of the illustrated elements for different embodiments of the present disclosure. The apparatus 1300 can perform the methods described in all the embodiments.

The display 1340 can be a viewfinder, an LCD, an LED display, an OLED display, a plasma display, a projection display, a touch screen, or any other device that displays information. The transceiver 1370 can be one or more transceivers that can include a transmitter and/or a receiver. The audio input and output circuitry 1330 can include a microphone, a speaker, a transducer, or any other audio input and output circuitry. The user interface 1360 can include a keypad, a keyboard, buttons, a touch pad, a joystick, a touch screen display, another additional display, or any other device useful for providing an interface between a user and an electronic device. The network interface 1380 can be a USB port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 1350 can include a RAM, a ROM, an EPROM, an optical memory, a solid-state memory, a flash memory, a removable memory, a hard drive, a cache, or any other memory that can be coupled to an apparatus.

The apparatus 1300 or the controller 1320 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 1350, elsewhere on the apparatus 1300, in cloud storage, and/or anywhere else that can store software and/or an operating system. For example, coding for operations can be implemented as firmware programmed into ROM. The apparatus 1300 or the controller 1320 may also use hardware to implement disclosed operations. For example, the controller 1320 may be any programmable processor. Furthermore, the controller 1320 may perform some or all of the disclosed operations. For example, at least some operations can be performed using cloud computing and the controller 1320 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1320 may be any controller or processor device or devices capable of operating an apparatus and implementing the disclosed embodiments. Some or all of the additional elements of the apparatus 1300 can also perform some or all of the operations of the disclosed embodiments. Also, elements of the apparatus 1300 can be configured to perform the various disclosed embodiments.

In operation, the apparatus 1300 can perform the methods and operations of the disclosed embodiments. The transceiver 1370 can transmit and receive signals, including data signals and control signals that can include respective data and control information. The controller 1320 can generate and process the transmitted and received signals and information.

According to a possible embodiment where the apparatus 1300 is a UE, the controller 1300 can control operations of the apparatus 1300. The transceiver 1370 can receive a WUS monitoring configuration from a network, such as a network entity operating on the network. The transceiver 1370 can receive a DRX mode configuration comprising at least an active period. For example, the DRX mode configuration can include active period information, such as an on-duration information. The DRX configuration can also include a slot offset, a periodicity, other information, or some combination thereof. The CSI reporting configuration can configure periodic, semi-persistent, and/or other resources for the transmission occasions.

The transceiver 1370 can receive at least one CSI reporting configuration that configures transmission occasions for transmission of at least one CSI report to the network outside the active period. The transceiver 1370 can receive a time offset configuration for CSI transmission outside the active period.

The transceiver 1370 can transmit a CSI report on a transmission occasion of the configured transmission occasions. The transmission occasion can be within the configured time offset from a WUS monitoring occasion. The WUS monitoring occasion can be outside the active period. The WUS monitoring occasion can be an occasion where a WUS can be received from a network entity. According to a possible embodiment, the WUS can be DCI with DCI format 2_6 or any other signal, format, information, and/or indication that can provide a WUS. The controller 1320 can determine the transmit occasion for transmitting the CSI report based on the configured time offset, the active period, the WUS monitoring configuration, and/or other information.

According to a possible embodiment, semi-persistent CSI report transmission occasions outside of the configured time offset can be deactivated. For example, deactivation of the semi-persistent CSI report transmission occasion configured outside of the at least one time offset value can be implicit.

According to a possible embodiment, the transceiver 1370 can receive a WUS in a WUS monitoring occasion. The controller 1320 can activate CSI reporting based on receiving the WUS. The activated CSI reporting can be based on the received CSI reporting configuration and can be activated for a configured number of transmission occasions following the received WUS.

According to a possible embodiment, the controller 1320 can assume activation of a semi-persistent CSI report transmission only on transmission occasions that are within the configured time offset before a start of the WUS monitoring occasions. For example, according to a possible embodiment, when a UE is in DRX mode, configured to monitor WUS, and also configured with semi-persistent CSI reporting, then the UE can assume implicit activation of the semi-persistent CSI report. According to another possible embodiment, the UE can activate semi-persistent CSI reporting within a DRX sleep period upon reception of WUS. According to another possible embodiment the WUS can include a bit field or bitmap that indicates activation of semi-persistent CSI reporting.

According to a possible embodiment, receiving the time offset configuration can include receiving a first configured time offset value and a second configured time offset value. The controller 1320 can activate semi-persistent CSI report transmission only on transmission occasions that are within the first configured time offset value before a start of WUS monitoring occasions, but no closer than the second configured time offset value before the start of WUS monitoring occasions.

According to a possible implementation of this embodiment, at least one of the time offset values can be preconfigured based on at least one CSI report measurement value that is configured to be reported. According to a possible example of this implementation, the transceiver 1370 can receive, when one of the at least one CSI report measurement value is CRI-RSRP, a WUS transmitted on a highest reported beam included in the CSI report.

For example, when one of the at least one CSI report measurement value is L1-RSRP, the network, upon receiving the corresponding CSI report, can determine best beams and transmit the following WUS using one of the best beams. The L1-RSRP can include cri-RSRP and/or ssb-Index-RSRP. L1, such as Layer 1, can be the physical layer. As a further example, the UE can report CSI reports containing CRI-RSRP of the best beam at a time offset compared to the WUS monitoring occasion and the gNB can transmit WUS in a DL beam according to the CSI report.

According to a possible embodiment, the transceiver 1370 can receive CSI-RS in a plurality of beams. The controller 1320 can determine a best beam of the plurality of beams based on the CSI-RS. The CSI report can include CRI-RSRP of a CSI-RS of the best beam. According to a possible embodiment, the UE can assume that all the remaining semi-persistent CSI reports within that C-DRX cycle are implicitly deactivated including those within a time offset of any subsequent WUS monitoring occasion within a sleep period of a current DRX cycle.

According to a possible embodiment, the controller 1320 can monitor WUS over a plurality of beams over a plurality of monitoring occasions. The transceiver 1370 can receive a WUS on a beam on a WUS monitoring occasion. The transmitted CSI report can include an indication of the beam on which the WUS was received. For example, the UE can be configured to monitor a plurality of beams over a plurality of monitoring occasions, it can successfully receive a WUS over one of the beams in a certain occasion, and the UE can provide the indication to the gNB. The UE can selectively transmit a CSI report after the successful reception of WUS to indicate gNB the beam used for the successful reception of WUS.

According to a possible embodiment, the transceiver 1370 can receive CSI-RS. The controller 1320 can measure a RSRP based on the received CSI-RS. The controller 1320 can compare the RSRP to a configured threshold. Transmitting the CSI report can include transmitting the CSI report only if the RSRP is above the configured threshold. For example, a UE can selectively transmit a CSI report outside the active period based on the comparison of the measured RSRP value with that of the configured threshold.

According to a possible embodiment, the transceiver 1370 can transmit the CSI report on a subset of transmission occasions of the configured transmission occasions. The subset of the transmission occasions may not include all configured transmission occasions.

According to a possible embodiment where the apparatus 1300 is a network entity, the controller 1300 can control operations of the apparatus 1300. The transceiver 1370 can signal a configuration for at least one WUS monitoring occasion. The transceiver 1370 can signal at least one CSI reporting configuration that configures transmission occasions for transmission of at least one CSI report. The transceiver 1370 can transmit a time offset configuration for CSI report transmission. The transceiver 1370 can receive a CSI report on a transmission occasion, where the transmission occasion can be within the configured time offset from a WUS monitoring occasion. The controller 1320 can generate the WUS configuration, the CSI reporting configuration, the time offset, and/or any other signals and/or information. The apparatus 1300 can also perform operations reciprocal to other disclosed operations performed at a UE.

According to a possible embodiment, the transceiver 1370 can transmit a WUS on a plurality of beams. The transceiver 1370 can receive a CSI report corresponding to at least one beam of the plurality of beams. The CSI report corresponding to at least one beam can include an indication of the beam on which the WUS was received.

According to a possible embodiment, the transceiver 1370 can transmit a CSI-RS on a plurality of beams. The transceiver 1370 can receive a CSI report corresponding to at least one beam of the plurality of beams. The CSI report can include CRI-RSRP for each beam. The transceiver 1370 can transmit a WUS over a beam with a highest reported CRI-RSRP included in the CSI report.

For example, a gNB can transmit WUS and/or CSI-RS using plurality of beams, such as in a beam sweeping manner, in different monitoring occasions and the UE can make use of CSI-RS reception for the correction of the Rx beam prior to the reception of WUS. The WUS can be transmitted on a beam with a highest reported CSI-RSRP value. The UE can selectively transmit CSI report in a transmission occasion after the successful reception of WUS to inform the gNB on the CRI-RSRP, which can be used to update the beam information of the PDCCH in the next on-duration timer.

At least some embodiments can provide for selective and implicit activation of semi-persistent CSI reporting in DRX mode when UE is configured with WUS monitoring. Implicit activation can be associated with timing relation to WUS monitoring occasions and/or specific report quantities.

At least some embodiments can provide for selective deactivation of periodic CSI reporting in DRX mode when UE is configured with WUS monitoring. Implicit deactivation can be associated with timing relation to WUS monitoring occasions and/or specific report quantities.

At least some embodiments can provide a method at a UE. The method can include receiving a DRX configuration by the network (gNB). The method can include receiving a configuration to monitor WUS signal (DCI format 2_6) by the network. The method can include receiving CSI reporting configuration(s) with periodic and/or semi-persistent resources, i.e., transmission occasions at regular time interval for transmission of CSI report(s) to the network. The method can include receiving at least a time offset configuration. The UE can determine the transmission of CSI report(s) only on a subset of those transmissions occasions that are within the configured time offset of the WUS monitoring occasion in the DRX mode.

According to a possible implementation, the activation of the semi-persistent CSI report transmission is assumed only on the transmission occasions that are within the configured time offset before the start of WUS monitoring occasions.

According a possible implementation, two time offset values are configured by the network and the activation of the semi-persistent CSI report transmission is assumed only on the transmission occasions that are within the configured time offset value 1 before the start of WUS monitoring occasions, but no closer than the time offset value 2 before the start of WUS monitoring occasions.

According a possible implementation, one or both of the time offset values can be pre-configured depending upon the CSI report quantity that is configured to be reported.

According to a possible implementation, when one of the CSI report quantities to be reported is L1-RSRP (including cri-RSRP and/or ssb-Index-RSRP), then the network, upon receiving the corresponding CSI report, can determine the best beam and transmit the following WUS using one of the best beams.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

LIST OF ABBREVIATIONS

3GPP 3rd Generation Partnership Project
ACK Acknowledgement
A-CSI Aperiodic CSI
AGC Automatic Gain Control
AL Aggregation Level
BWP Bandwidth Part
CBG Code Block Group
CC Component Carrier
CCCH SDU Common Control Channel Service Data Unit
CCE Control Channel Element
CG Configured Grant
CI Cancellation Indication
CORESET Control Resource Set
CSI-RS Channel State Information Reference Signal
CRC Cyclic Redundancy Check
CRI CSI-RS Resource Index
cri-RSRP CRI Reference Signal Received Power
C-RNTI Cell RNTI
CQI Channel Quality Information
CRI CSI-RS Resource Indicator
CSI Channel State Information
CSI-RS Channel State Information Reference Signal
CSS Common Search Space
DCI Downlink Control Information
DCI 2_6 DCI format 2_6
DL Downlink
DMRS DeModulation Reference Signal
DRX Discontinuous Reception
GC-DCI Group Common DCI
gNB gNodeB
HARQ-ACK Hybrid Automatic Repeat Request-Acknowledgement
LMF Location Management Function
MAC CE Medium Access Control Control Element
MCG Master Cell Group
MCS Modulation and Coding Scheme
MPE Maximum Permissible Exposure
NACK Non-Acknowledgement
NB-IoT NarrowBand-Internet of Things
NR New Radio
NR-U NR Unlicensed
PCell Primary Cell
PDSCH Physical Downlink Shared Channel
PI Pre-emption Indication
PMI Precoding Matrix Indicator
PRS Positioning Reference Signal
PT-RS Phase Tracking Reference Signal
PUCCH Physical Uplink Control Channel
PUSCH Physical Uplink Shared Channel
FDD Frequency Division Duplex
PO Paging Occasion
QCL Quasi Co-Location
RACH Random Access Channel
Redcap Reduced Capability
RNTI Radio Network Temporary Identifier
RRM Radio Resource Management
RS Reference Signal
RSRP Reference Signal Received Power
RSTD Reference Signal Time difference
Rx Receive
SCG Secondary Cell Group
SCS Sub Carrier Spacing
SFI Slot Format Indicator
SLIV Start and Length Indicator Value
SP-CSI Semi-persistent CSI
SPS Semi-persistent scheduling
SR Scheduling Request
SRS Sounding Reference Signal
SRI SRS Resource Indicator
SS/PBCH Synchronization Signal/Physical Broadcast Channel
SSB Synchronization Signal Block
ssb-Index-RSRP Synchronization Signal Block Index RSRP
SSBRI SS/PBCH Block Resource Index
TB Transport Block
TCI Transmission Configuration Indicator
TDD Time Division Duplex
TDRA Time Domain Resource Allocation
TPC Transmit Power Control
TRP Transmission Reception Point
TRS Tracking Reference Signal
Tx Transmit
UCI Uplink Control Information
UE User Equipment
UL Uplink
URLLC Ultra-Reliable Low-Latency Communication
USS User-specific Search Space
WUS Wake Up Signal

We claim:

1. A user equipment (UE) for wireless communication, comprising:
at least one memory; and
at least one processor coupled with the at least one memory and configured to cause the UE to:
receive, from a network entity (NE), a wake up signal monitoring configuration;
receive a discontinuous reception mode configuration comprising at least an active period;
receive at least one channel state information reporting configuration that configures transmission occasions for transmission of at least one channel state information report to the NE outside the active period;
receive a time offset configuration that configures a time offset for channel state information transmission outside the active period; and
transmit a channel state information report on a transmission occasion of the transmission occasions, wherein the transmission occasion is within the time offset from a wake up signal monitoring occasion, and wherein the wake up signal monitoring occasion is outside the active period.

2. The UE of claim 1, wherein the at least one processor is configured to cause the UE to:
receive a wake up signal in an additional wake up signal monitoring occasion; and
activate channel state information reporting based on the at least one channel state information reporting configuration and for a number of transmission occasions following the wake up signal.

3. The UE of claim 1, wherein a semi-persistent channel state information report transmission is activated on one or more transmission occasions that are within the time offset before a start of the wake up signal monitoring occasion.

4. The UE of claim 1, wherein to receive the time offset configuration, the at least one processor is configured to cause the UE to:
receive a first time offset value and a second time offset value; and activate semi-persistent channel state information report transmission on one or more transmission occasions that are within the first time offset value before a start of the wake up signal monitoring occasion and that are outside of a threshold distance from the second time offset value before the start of the wake up signal monitoring occasion.

5. The UE of claim 4, wherein at least one of the first time offset value or the second time offset value is based on at least one channel state information report measurement value that is to be reported.

6. The UE of claim 5, wherein the at least one processor is configured to cause the UE to receive, based on the at least one channel state information report measurement value including a channel state information reference signal resource indicator reference signal received power, a wake up signal transmitted on a highest reported beam included in the channel state information report.

7. The UE of claim 1, wherein the at least one processor is configured to cause the UE to:
receive at least one channel state information reference signal in a plurality of beams; and
determine a best beam of the plurality of beams based on the at least one channel state information reference signal, wherein the channel state information report includes a channel state information reference signal resource indicator reference signal received power of a channel state information reference signal of the best beam.

8. The UE of claim 1, wherein the at least one processor is configured to cause the UE to:
monitor for a wake up signal over a plurality of beams and over a plurality of wake up signal monitoring occasions; and
receive the wake up signal on a beam of the plurality of beams and on at least one wake up signal monitoring occasion of the plurality of wake up signal monitoring occasions, wherein the channel state information report includes an indication of the beam on which the wake up signal was received.

9. The UE of claim 1, wherein the at least one processor is configured to cause the UE to:
receive at least one channel state information reference signal;
measure a reference signal received power based on the at least one channel state information reference signal; and
compare the reference signal received power to a threshold value, wherein transmitting the channel state information report is based on the reference signal received power being above the threshold value.

10. The UE of claim 1, wherein a wake up signal associated with the wake up signal monitoring configuration comprises downlink control information with downlink control information format 2_6.

11. The UE of claim 1, wherein the at least one processor is configured to cause the UE to transmit the channel state information report on a subset of transmission occasions of the transmission occasions.

12. A method performed by a user equipment (UE), the method comprising:
receiving, from a network entity (NE), a wake up signal monitoring configuration;
receiving a discontinuous reception mode configuration comprising at least an active period;
receiving at least one channel state information reporting configuration that configures transmission occasions for transmission of at least one channel state information report to the NE outside the active period;
receiving a time offset configuration that configures a time offset for channel state information transmission outside the active period; and
transmitting a channel state information report on a transmission occasion of the transmission occasions, wherein the transmission occasion is within the time offset from a wake up signal monitoring occasion, and wherein the wake up signal monitoring occasion is outside the active period.

13. A network entity (NE) for wireless communication, comprising:
at least one memory; and
at least one processor coupled with the at least one memory and configured to cause the NE to:
transmit a wake up signal monitoring, configuration;
transmit at least one channel state information reporting configuration that configures transmission occasions for transmission of at least one channel state information report;
transmit a time offset configuration that configures a time offset for channel state information report transmission; and
receive a channel state information report on a transmission occasion of the transmission occasions, wherein the transmission occasion is within the time offset from a wake up signal monitoring occasion.

14. The NE of claim 13, wherein the at least one processor is configured to cause the NE to transmit a wake up signal on a plurality of beams, wherein the channel state information report includes an indication of a beam of the plurality of beams on which the wake up signal was received.

15. The NE of claim 13, wherein the at least one processor is configured to cause the NE to:
transmit at least one channel state information reference signal on a plurality of beams;
receive a channel state information report corresponding to at least one beam of the plurality of beams, the channel state information report including a respective channel state information reference signal resource indicator reference signal received power for the plurality of beams; and
transmit a wake up signal on a beam of the plurality of beams with a highest channel state information reference signal resource indicator reference signal received power of the respective channel state information reference signal resource indicator reference signal received power for the plurality of beams.

16. A processor for wireless communication, comprising:
at least one memory; and
at least one controller coupled with the at least one memory and configured to cause the processor to:
receive a wake up signal monitoring configuration entity (NE);
receive a discontinuous reception mode configuration comprising at least an active period;
receive at least one channel state information reporting configuration that configures transmission occasions for transmission of at least one channel state information report to the NE outside the active period;
receive a time offset configuration that configures a time offset for channel state information transmission outside the active period; and
transmit a channel state information report on a transmission occasion of the transmission occasions, wherein the transmission occasion is within the time offset from a wake up signal monitoring occasion, and wherein the wake up signal monitoring occasion is outside the active period.

17. The processor of claim 16, wherein the at least one controller is configured to cause the processor to:
receive a wake up signal in an additional wake up signal monitoring occasion; and
activate channel state information reporting based on the at least one channel state information reporting configuration and for a number of transmission occasions following the wake up signal.

18. The processor of claim 16, wherein a semi-persistent channel state information report transmission is activated on one or more transmission occasions that are within the time offset before a start of the wake up signal monitoring occasion.

19. The processor of claim 16, wherein, to receive the time offset configuration, the at least one controller is configured to cause the processor to:
receive a first time offset value and a second time offset value; and
activate semi-persistent channel state information report transmission on one or more transmission occasions that are within the first time offset value before a start of the wake up signal monitoring occasion and that are outside of a threshold distance from the second time offset value before the start of the wake up signal monitoring occasion.

20. The processor of claim 19, wherein at least one of the first time offset value or the second time offset value is based on at least one channel state information report measurement value that is to be reported.

\* \* \* \* \*